(12) United States Patent
Shao et al.

(10) Patent No.: US 7,710,939 B2
(45) Date of Patent: May 4, 2010

(54) METHOD AND SYSTEM FOR POWER SAVING IN WIRELESS LOCAL AREA COMMUNICATION NETWORKS

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 607 days.

(21) Appl. No.: 11/703,405

(22) Filed: Feb. 6, 2007

(65) Prior Publication Data
US 2008/0186890 A1    Aug. 7, 2008

(51) Int. Cl.
*H04J 3/24* (2006.01)
*G08C 17/00* (2006.01)

(52) U.S. Cl. .................................. 370/349; 370/311

(58) Field of Classification Search .................. None
See application file for complete search history.

(56) References Cited

U.S. PATENT DOCUMENTS

| | | | |
|---|---|---|---|
| 5,596,315 A * | 1/1997 | Olds et al. ................ | 340/7.2 |
| 7,231,530 B1 * | 6/2007 | Miller et al. ............... | 713/320 |
| 2005/0025080 A1 * | 2/2005 | Liu ........................... | 370/311 |
| 2005/0047357 A1 | 3/2005 | Benveniste | |
| 2006/0045035 A1 * | 3/2006 | Liu ........................... | 370/311 |
| 2006/0285517 A1 | 12/2006 | Kakani | |
| 2007/0037548 A1 | 2/2007 | Sammour et al. | |
| 2008/0181156 A1 * | 7/2008 | Ecclesine .................. | 370/311 |

OTHER PUBLICATIONS

Mujtaba, S. A. et al., "TGn Sync Proposal Technical Specification," IEEE 802.11-04-0889r7, Jul. 2005, pp. 1-133.
IEEE P802.11e/D13.0 (Jan. 2005), "Amendment: Medium Access Control (MAC) Quality of Service (QoS) Enhancements," pp. 1-198.
IEEE Wireless LAN Edition (2003), "A compilation based on IEEE Std 802.11TM—1999 (R2003) and its amendments," pp. 1-706.
IEEE Std. 802.11a-1999, adopted and redesignated as ISO/IEC 8802-11:1999/Amd 1: 2000 (E), 2000, pp. 1-91.
Van Veen, B.D.; Buckley, K.M., "Beamforming: a versatile approach to spatial filtering," ASSP Magazine, IEEE, vol. 5, Iss. 2, Apr., 1988, pp. 4-24.
Adrian Stephens and Sean Coffey, "Joint Proposal: High Throughput Extension to the 802.11 Standard: Mac,"11-05-1095-02-000n-joint-proposal-mac-specifications, Nov. 2005.
"Amendment: Wireless LAN MAC and PHY specifications: Enhancement for Higher Throughputs," IEEE P802.11n/D1.0, Mar. 2006.
Kose, C., and Edwards, B., "IEEE P802.11, Wireless LANs, WWiSE Proposal: High throughput extension to the 802.11 Standard," doc: IEEE 802.11-05-0149r2, Mar. 2005, 93 pages.
U.S. Non-Final Office Action for U.S. Appl. No. 11/598,977 mailed on Nov. 27, 2009.

* cited by examiner

*Primary Examiner*—Erika A Gary
(74) *Attorney, Agent, or Firm*—Kenneth L. Sherman, Esq.; Michael Zarrabian, Esq.; Myers Andras Sherman LLP (57) ABSTRACT

A power saving process for wireless communications is provided, wherein a receiving station examines the header of each incoming frame and stops decoding data symbols of the frame, upon determining that the incoming frame is not intended for that receiving station. In one implementation, the receiving station stops receiving and decoding data symbols of the frame by entering a power saving mode. This conserves power at the receiving station.

46 Claims, 8 Drawing Sheets

METHOD AND SYSTEM FOR POWER SAVING IN WIRELESS LOCAL AREA COMMUNICATION NETWORKS

FIELD OF THE INVENTION

The present invention relates to Wireless Local Area Networks (WLANs), and in particular, to power saving in high throughput WLANs.

BACKGROUND OF THE INVENTION

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PLCP Service Data Unit (PSDU) and is transferred to a PHY layer in the transmitter to attach a PHY header (i.e., a PHY preamble) thereto to construct a PLCP Protocol Data Unit (PPDU). The PHY header includes parameters for determining a transmission scheme including a coding/modulation scheme.

Many battery powered devices such as cellular phones and consumer electronic (CE) devices are being provided with the capability to access high throughput WLANs. An efficient method of scheduling uplink and downlink frame transmissions between an access point (AP) and stations in a WLAN can reduce power consumption and benefit battery powered devices.

Conventional power saving solutions are inefficient because a receiving station continues receiving and decoding data symbols of an incoming frame, even if the incoming frame is not intended for that receiving station. This is because such conventional receiving stations do not examine the frame PHY/MAC header of incoming frames at a per-frame level. This leads to unnecessary power consumption at the receiving stations. There is, therefore, a need for an efficient power saving mechanism for WLANs in general, and for high throughput WLANs, in particular.

BRIEF SUMMARY OF THE INVENTION

The present invention provides a power saving process for wireless communications, wherein a receiving station checks the header of each incoming frame and stops receiving and decoding data symbols of the frame, upon determining that the incoming frame is not intended for that receiving station. In one implementation, the receiving station stops receiving and decoding data symbols of the frame by entering a power saving mode. This conserves power at the receiving station.

The step of checking the header further includes checking a PHY header in the frame to determine if the receiver can support the capability required by the PHY header to receive the frame. If the receiver cannot support the capability required by the PHY header, then the receiver enters a power saving state. If the receiver can support the capability required by the PHY header, then the MAC header in the frame is checked to determine if the receiver is identified therein. The receiver enters a power saving state if the receiver is not identified in the MAC header.

These and other features, aspects and advantages of the present invention will become understood with reference to the following description, appended claims and accompanying figures.

DETAILED DESCRIPTION OF THE INVENTION

The present invention provides an efficient power saving process for WLANs in general, and for high throughput WLANs, in particular. The power saving process involves interpreting PHY and MAC headers of incoming frames at per-frame level, and upon detecting that an incoming frame is not intended for a receiving station, the receiving station stops receiving and decoding data symbols of the frame. This reduces power consumption at receiving stations.

A typical receiving station (a receiver) in a WLAN includes a PHY layer and a MAC layer. The PHY layer receives an incoming frame, decodes the entire payload and provides it to the MAC layer. When the MAC layer receives the entire frame from the PHY layer, the MAC layer then examines the MAC header of the frame to determine if it was intended for that receiver. As such, the MAC header of an incoming frame is examined after arrival of the frame payload (e.g., the MSDU) at the MAC layer of the receiver.

According to an embodiment of the present invention, power saving is achieved by interpreting the MAC header of an incoming frame first, before arrival of the frame payload (e.g., the MSDU) at the MAC layer of the receiver. If the MAC layer determines that the frame is not intended for that receiver, then the MAC layer requests the PHY layer to stop decoding the rest of the frame and go into standby state (i.e., low power consumption state), before the end of a frame event. An end of the frame event indicates that the PHY layers have completed receiving and decoding all data information belonging to a frame.

An example implementation of such a power saving process is described below in relation to a high throughput WLAN, such as the IEEE 802.11n, which favors larger frames (packets) to improve transmission efficiency. The IEEE 802.11n protocol allows a maximum throughput of at least 100 Mbps (at the MAC layer). The PHY preamble and header are transmitted using a fixed time interval. When the frame sizes are smaller, the PHY overhead consumes a significant amount of channel time. Increasing the payload reduces the PHY overhead. The TGn Sync technical specification (S. A. Mujtaba, "TGn Sync Proposal Technical Specification," IEEE 802.11-04-0889r7, July 2005, incorporated herein by reference) provides a scheme for Aggregated MSDU (A-MSDU). The A-MSDU joins together multiple MSDUs and creates a single larger MSDU that is transported in a MPDU. The purpose of the A-MSDU is to allow multiple MSDUs being sent to the same receiver to be aggregated and sent in a single MPDU, which improves the efficiency of the MAC layer, particularly when there are many small MSDUs.

Figure 1:
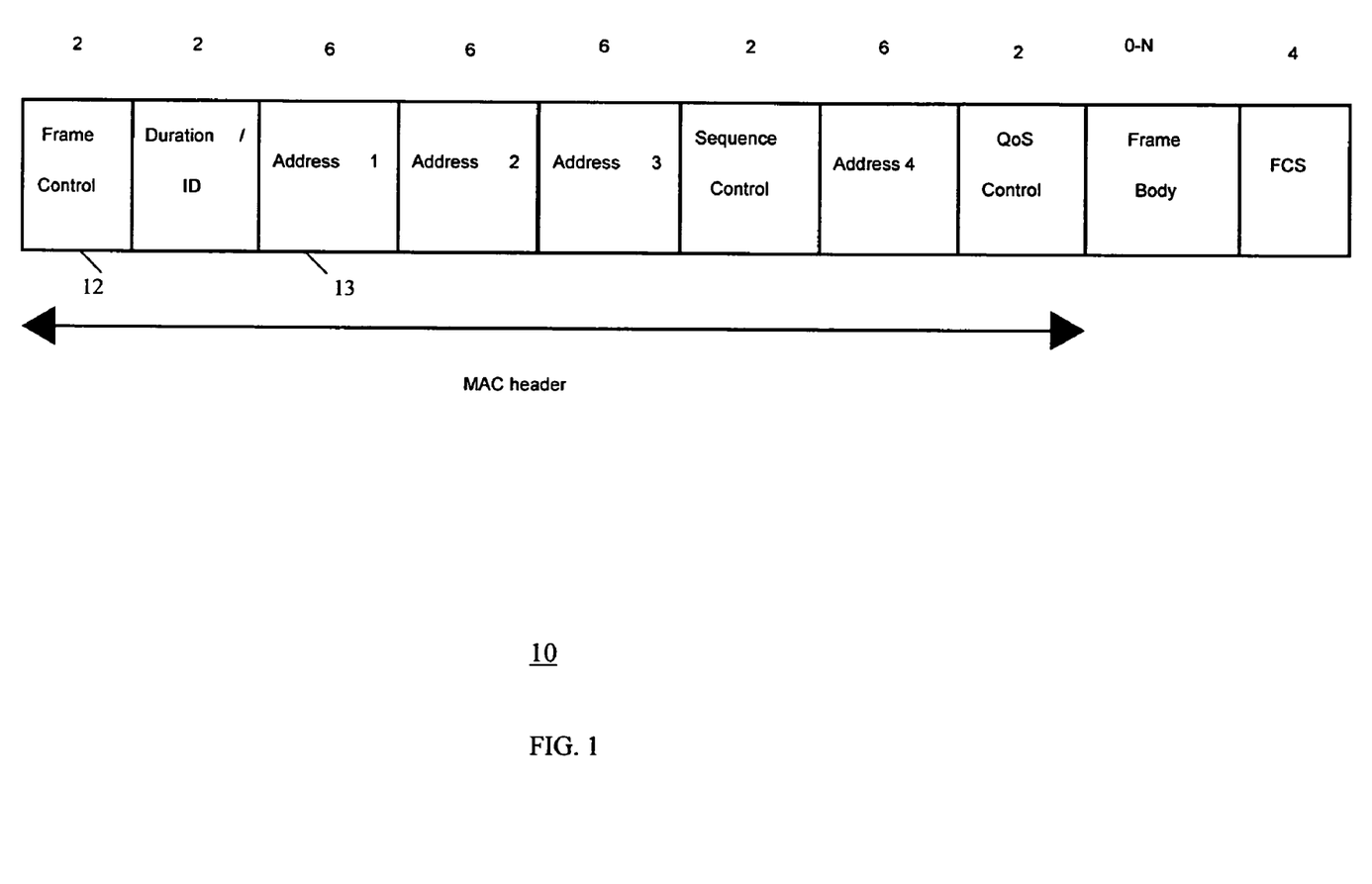
FIG. 1 shows the structure of a conventional MAC frame format.
Figure 2:
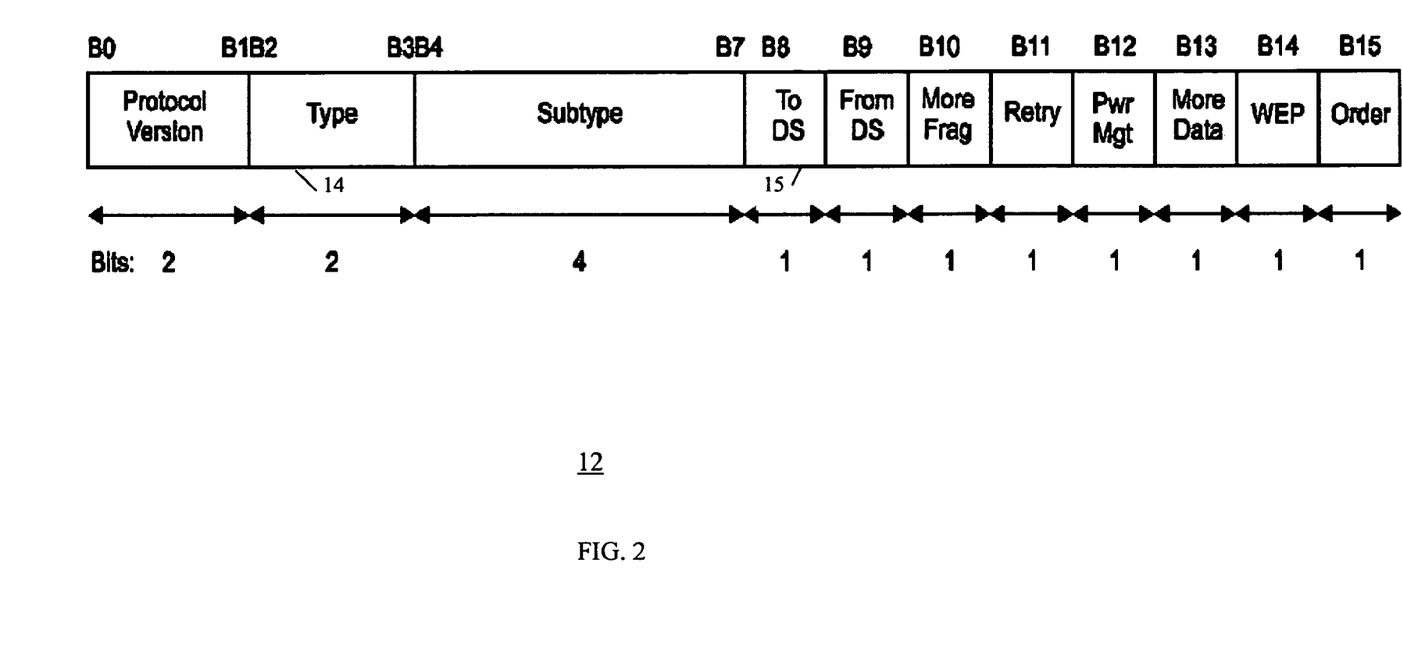
FIG. 2 shows the structure of a conventional MAC frame control field.

FIG. 1 shows a conventional MAC header 10 for a frame, including a MAC frame control field 12. FIG. 2 shows details of a MAC frame control field 12 which includes a Type field 14 and a To DS field 15, among others. The MAC layer determines whether to enter power save states by stopping receiving and decoding, using the information in the MAC header 12 and the frame control field 14. The MAC header is checked for power saving triggering information, as described herein. The MAC header parser in the MAC layer analyzes the MAC frame control field 12 first. If Type <>"10", this indicates that the frame is a small control or management frame. In that case, a power saving process is not necessary since decoding the frame takes a short time. If the To DS field 14 is set to 1, then the MAC layer need not perform further cyclic redundancy code (CRC) checking. If the MAC layer has not received the entire MAC payload, then the MAC layer commands the PHY layer to stop receiving and decoding the data frame.

If the To DS field 14 is set to 0, then the Address 1 field 13 in the MAC header 10 (FIG. 1) is not equal to the receiver address and is not a broadcast/multicast address, then the MAC layer needs not perform further CRC checking. If the MAC layer has not received the entire MAC payload, then the MAC layer commands the PHY layer to stop receiving and decoding the data frame (e.g., the MAC layer sends a PHY_STANDBY.req( ) to the PHY layer).

Figure 3:
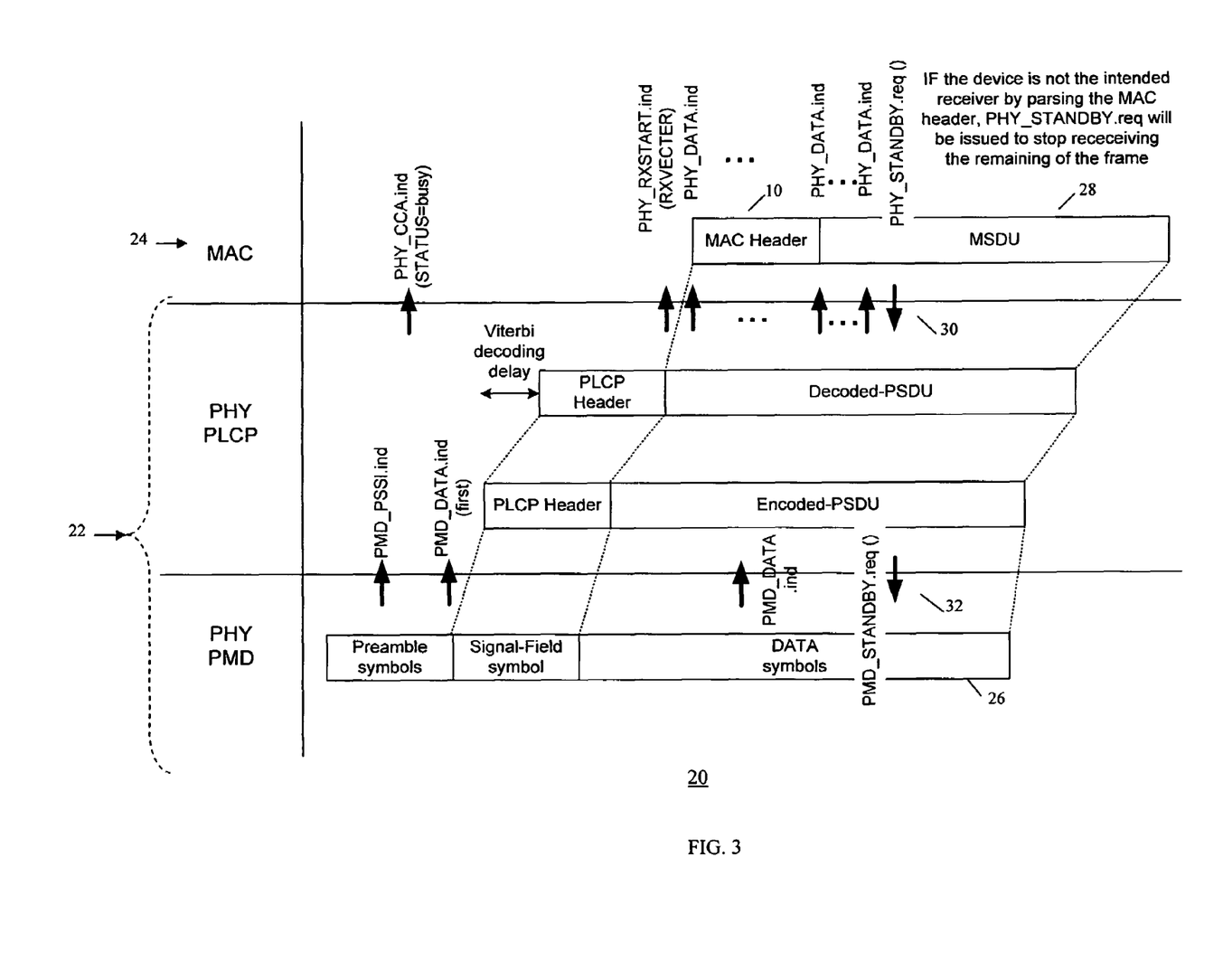
FIG. 3 shows an example process for power saving in a receiving station, according to an embodiment of the present invention.

FIG. 3 shows a diagrammatical example of a power saving process 20 according to the present invention, which involves certain interactions between a PHY layer 22 and a MAC layer 24 in a receiver operating in a WLAN. After the PHY layer 22 receives a symbol 26 from the receiver antenna and decodes the symbol, the PHY layer 22 reports that data to the MAC layer 24 immediately without buffering. Power saving is achieved by interpreting the MAC header 10 first before the entire payload 28 arrives at the MAC layer 24. The MAC layer 24 interprets the MAC header 10 first while receiving data from the PHY layer 22. There is no need for the MAC layer 24 to wait for the entire MAC payload 28 to arrive and check its CRC, before parsing the MAC header 10. If the MAC layer 24 of the receiver determines that the frame is not for that receiver, then the MAC layer 24 can send a request to the PHY layer 22 to stop decoding the rest of the frame and go into standby state (i.e., low power consumption state) before the end of the frame, thereby saving power.

Referring to FIG. 3, two primitives are provided for placing the PHY layer in standby: a PHY_STANDBY.req( ) 30 and a PMD_STANDBY.req( ) 32. The MAC layer uses the PHY_STANDBY.req( ) 30 to request the Physical Layer Convergence Protocol (PLCP) sublayer of the PHY layer 22 to stop receiving and decoding the remainder of the incoming frame. Upon receiving the PHY_STANDBY.req( )30, the PHY PLCP sublayer sends the PMD_STANDBY.req( )32 to the Physical Medium Dependent (PMD) sublayer of the PHY layer 22 to stop receiving and decoding the incoming frame. The PHY_STANDBY.req( )30 and PMD_STANDBY.req( )32 function calls are made only if parsing the MAC header 10 by the MAC layer 24 can be completed before the PHY layer 22 completes decoding the incoming frame. If the entire MAC payload 28 has already arrived at the MAC layer 24 when parsing the MAC header 10 is completed, then the MAC layer 24 does not initiate the function calls PHY_STANDBY. req( )30 and PMD_STANDBY.req( ) 32.

Figure 4:
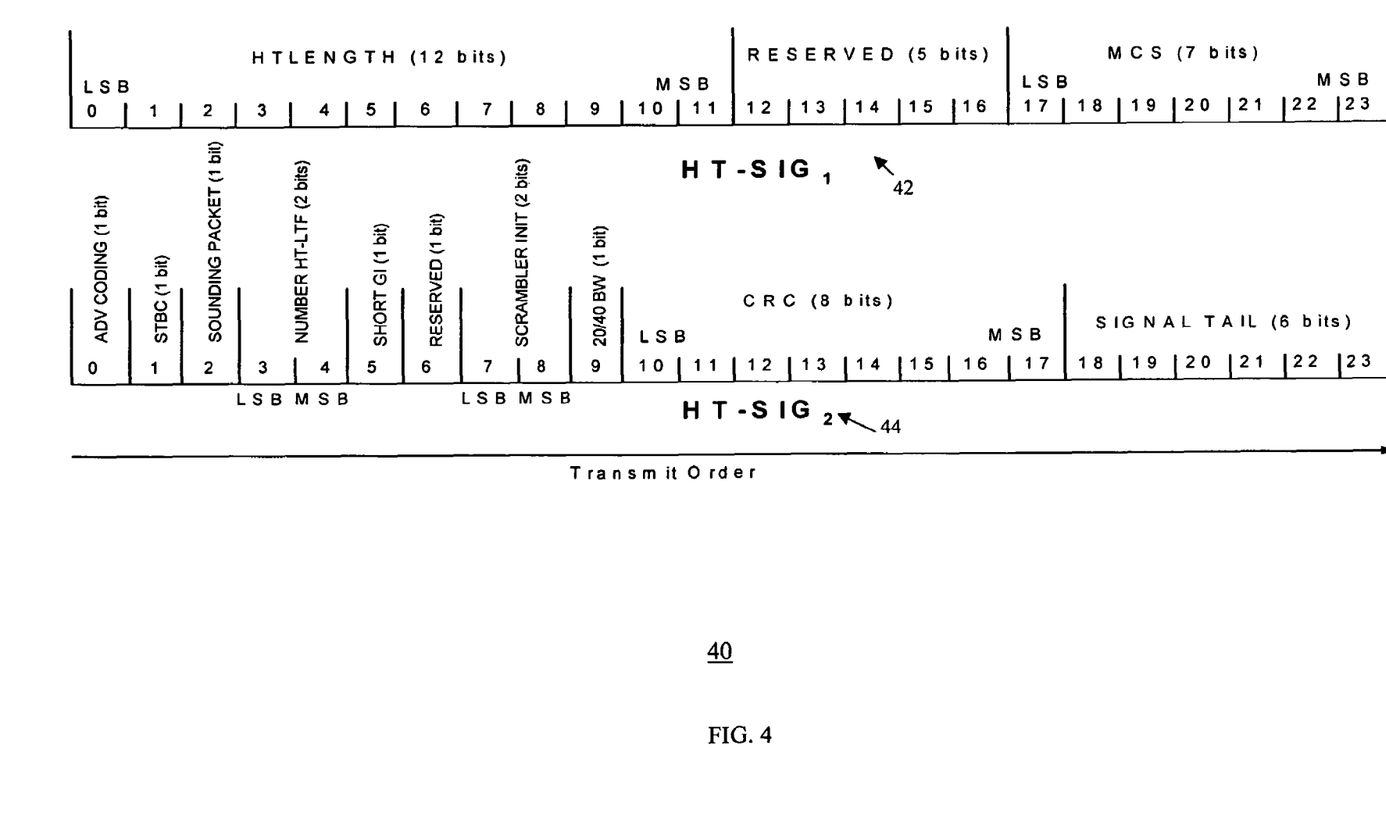
FIG. 4 shows the structure of a conventional HT-SIG format.

The PHY preamble of each incoming frame is analyzed at the PHY layer. For each PPDU, the PHY layer interprets the high throughput signal (HT-SIG) field therein. A HT-SIG field 40 is shown in FIG. 4, is further described in S. A. Mujtaba, "TGn Sync Proposal Technical Specification," IEEE 802.11-04-0889r7, July, 2005, incorporated herein by reference). The HT-SIG field 40 includes a HT-SIG$_1$ field 42 and a HT-SIG$_2$ field 44. Based on the interpretation of the HT-SIG field, the receiver determines whether it can handle the incoming frame or not. If the receiver cannot handle the incoming frame (meaning the frame is not intended for that receiver), then the receiver stops receiving and enters a standby state until the end of the frame is reached.

Generally, if the receiver cannot support the capability requirement indicated by the HT-SIG 40, then according to the present invention, the receiver enters into standby during the incoming frame transmission period. For example:

If the Advanced Coding (ADV) bit in the HT-SIG 40 is set to "1", then a receiver which cannot support advanced coding enters into standby during the frame period.

If the Space-Time Block Coding (STBC) bit in the HT-SIG 40 is set to "1", then a receiver which cannot support the STBC function enters into standby during the frame period.

If the Sounding Packet bit in the HT-SIG 40 is set to "1", then a receiver which cannot support transmit beam-forming enters into standby during the frame period.

If the 20/40 Bandwidth (BW) bit in the HT-SIG 40 is set to "1" to indicate the frame is transmitted in a 40 MHz channel, then a receiver which operates on a 20 MHz channel enters into standby during the frame period.

If a receiver cannot support the Modulation and Coding Scheme (MCS) indicated in the HT-SIG 40, then the receiver enters into standby during the frame period.

In the power standby mode, the PHY layer stops receiving and decoding symbols, and can stop sensing the channel for power saving.

Figure 5:
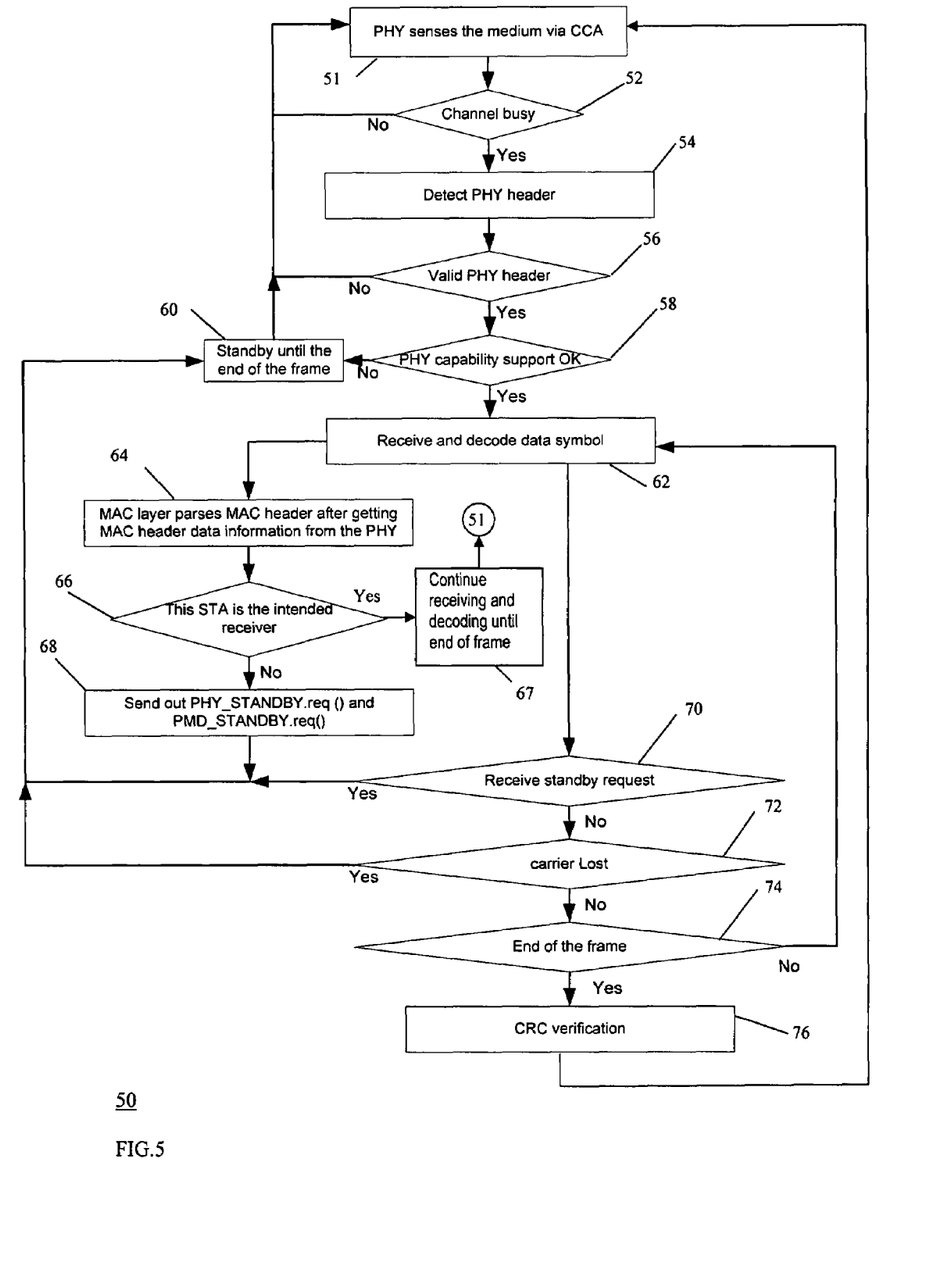
FIG. 5 shows a flowchart of the steps of an example power saving process, according to an embodiment of the present invention.

FIG. 5 shows a flowchart of steps of a power saving per-frame process 50, according to an embodiment of the present invention, which includes the steps of:

Step 51: The PHY layer senses the channel via a Clear Channel Assessment (CCA) as specified in the 802.11a specification to determine if the channel is busy.

Step 52: If the channel is busy, then go back to step 51, otherwise go to step 54.

Step 54: PHY layers detects the validity of the PHY header of an incoming frame.

Step 56: If the PHY header is valid, go to step 58 otherwise go back to step 51.

Step 58: Based on the HT-SIG field of the header, determine if the receiver is capable of processing the incoming frame, as discussed above. If yes, go to step 62, otherwise go to step 60.

Step 60: Enter the standby (power save) cycle until the end of the incoming frame, then go back to step 51 to process a next incoming frame.

Step 62: Receive and decode data symbols in the incoming frame.

Step 64: Upon receiving symbols which carry the MAC header information, the MAC layer parses the MAC header of the frame.

Step 66: Based on the information in the MAC header, the MAC layer determines if this receiver station (STA) is the intended receiver of the frame? If so, go to step 67, otherwise go to step 68.

Step 67: Continue receiving and decoding the frame (e.g., as in IEEE 802.11a) until the end of frame, then go back to step 51.

Step 68: If not the intended receiver, then issue the function calls PHY_STANDBY.req( ) and PMD_STANDBY. req( ) to request the PHY layer to stops receiving and decoding the frame, and go to step 60 to standby.

Step 70: From step 62, determine if a standby request is received at the PHY layer? If so, go to step 60 to standby.

Step 72: Otherwise, determine if a carrier Lost event has occurred. If so, go to step 60 to standby.

Step 74: Otherwise, determine if an end of frame event has occurred? If not, go to step 62 to process the remainder of the frame. Otherwise, go to step 76.

Step 76: Perform CRC verification on the decoded data. Go back to step 51 to receive the next frame.

Figure 6:
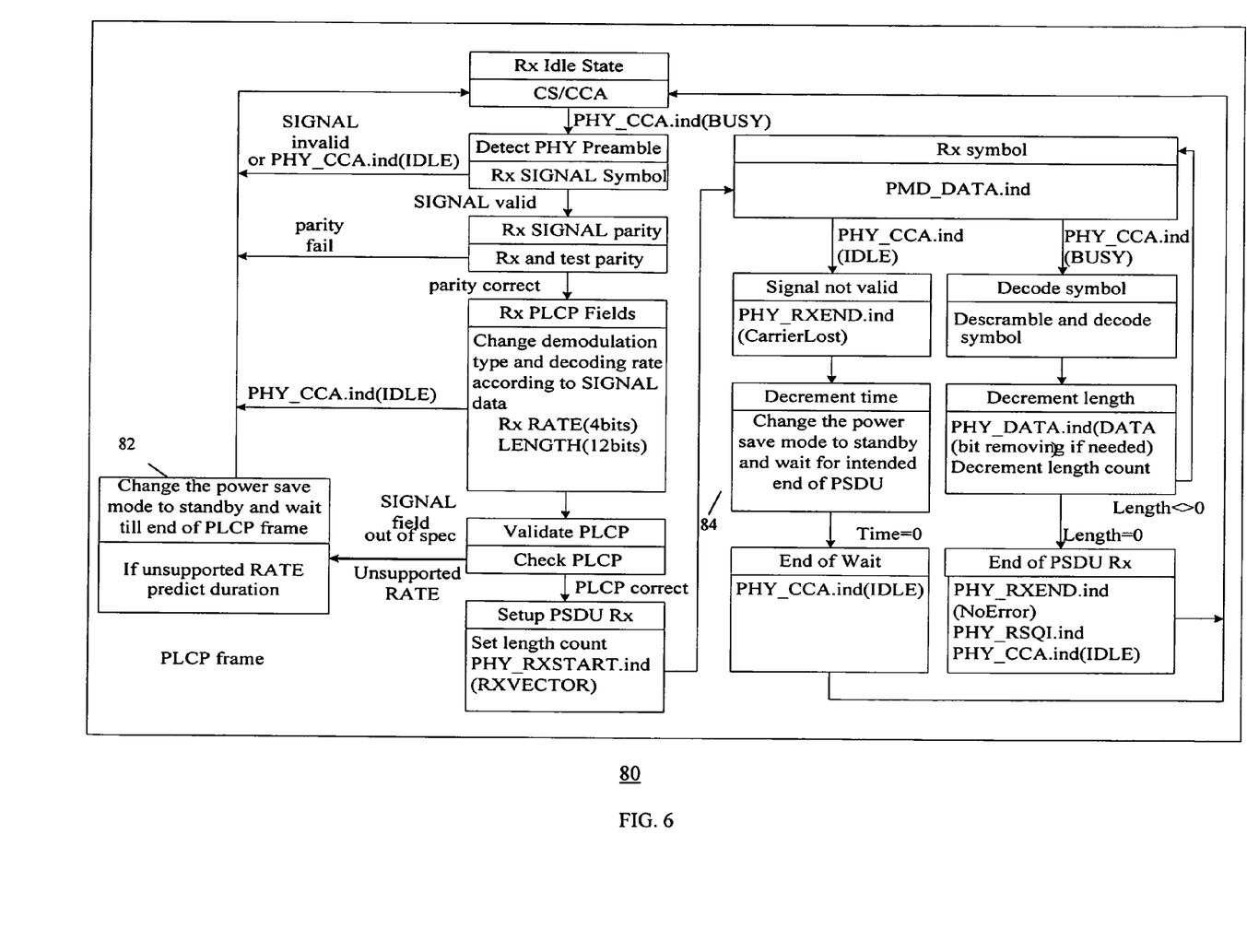
FIG. 6 shows an example block diagram of a power saving receiver, according to an embodiment of the present invention.

FIG. 6 shows an example block diagram of a power saving receiver 80 implementing the above steps in examining the HT-SIG field of the PHY preamble in incoming frames, according to an embodiment of the present invention. The receiver 80 is based on the IEEE 802.11a specification (IEEE Std 802.11a-1999, adopted by ISO/IEC and redesignated as ISO/IEC 8802-11:1999/Amd 1: 2000(E), incorporated herein by reference). However, the modules 82 and 84 are modified according to the present invention. The module 82 changes the power save mode to standby for predicted duration while the CCA is still busy. The module 84 changes the power save mode to standby until the end of the PSDU in the frame. A function PHY_RXEND.ind(Carrier Lost) informs the module 84 of the MAC layer that a signal is not valid at the carrier, whereby module 84 places the PHY layer into a standby state. Further, when the receiver 80 finds a PLCP signal field is out of specification (e.g., an unsupported rate specified in the HT-SIG field 40), the module 82 enters the receiver in standby mode to save power. The remaining modules in FIG. 6 behave as said IEEE 802.11a specification, and are not described further herein.

Figure 7:
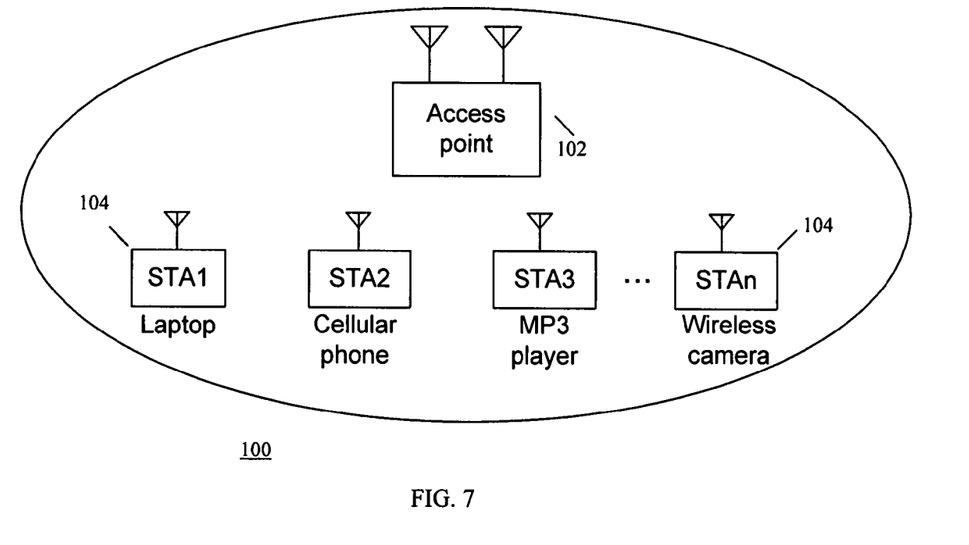
FIG. 7 shows an example block diagram of a WLAN system, implementing a power saving method, according to an embodiment of the present invention.

FIG. 7 shows a block diagram of an example WLAN system 100 implementing a power saving process according to an embodiment of the present invention. The system 100 includes an access point (AP) 102 and n STAs 104, wherein some stations such as a cellular phone and a wireless camera are power-saving STAs. In the presence of an AP, usually STAs do not communicate with one another directly if the WLAN works at the infrastructure mode. All frames are transmitted to the AP, and the AP transmits them to their destined STAs. Since the AP is forwarding all frames, the STAs are no longer required to be in range of one another. The only requirement is that the STAs be within range of the AP. In FIG. 7, as an example, if STA 1 sends a frame to STA 2, STA 1 first sends the frame to the AP, and the AP forwards the frame to STA 2. The radio medium is shared among different stations and the APs using an algorithm called Carrier Sense Multiple Access with Collision Avoidance (CSMA/CA) during the contention Period (CP).

Figure 8:
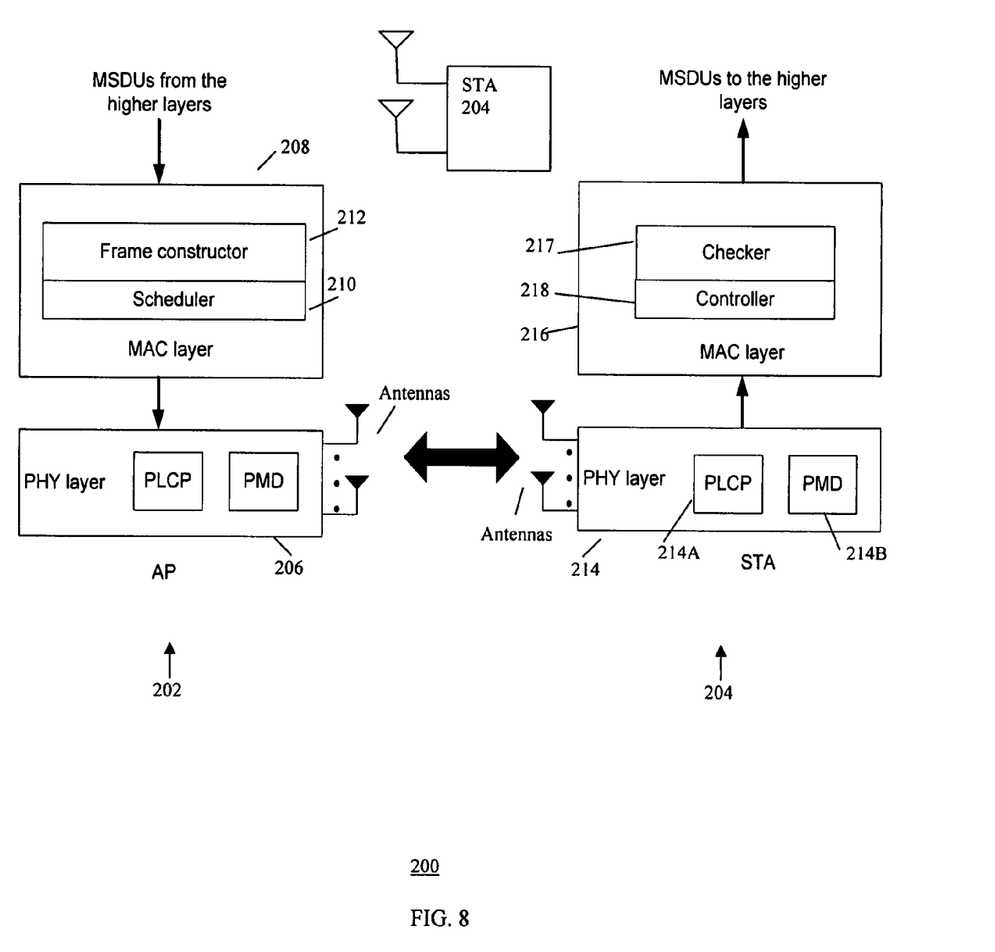
FIG. 8 shows a protocol architecture implementing a power saving process in the system of FIG. 7, according to an embodiment of the present invention.

FIG. 8 shows an example of protocol architecture 200 for the AP and the STAs in FIG. 7, which implements a power saving process, according to an embodiment of the present invention. The protocol architecture 200 includes an AP 202 and one or more STAs 204. The AP 202 comprises a PHY layer 206 and a MAC layer 208. The PHY layer 206 implements a type of IEEE 802.11 communication standard for transmitting data over a channel. The MAC layer 208 comprises a scheduler function 210 and a frame constructor 212. The scheduler function 210 provides schedules for downlink and uplink transmissions, and the frame constructor 212 constructs frames for transmission to each STA 204.

A power saving STA 204 includes a PHY layer 214 and a MAC layer 216. The PHY layer 214 includes a PLCP 214A and a physical medium dependent (PMD) 214B. Each STA 204 further includes a MAC layer 216 that comprises a checker 217 and a power controller 218.

The PHY layer 214 checks the PHY header (HT-SIG) of each incoming frame first, to determine if the STA 204 can support the capability indicated by the HT-SIG to receive the packet. If not, then it means that the STA 204 is not the intended receiver of the incoming frame and the PHY layer 214 enters standby. Otherwise, the checker 217 of the MAC layer 216 parses and checks the MAC header of the frame as soon as the PHY layer 214 provides it to the MAC layer 216. The checker 217 checks the MAC header of the frame. If the MAC header shows that the STA 204 is not the intended receiver, the controller 218 instructs the PHY layer 214 to stop receiving and decoding the remainder of the data frame. Specifically, the checker 217 parses and checks the MAC header to determine if the incoming frame is intended for this STA 204. If the incoming frame is not intended for this STA 204, then the controller 218 issues a PHY_STANDBY.req( ) to the PHY PLCP 214A which in turn issues a PMD_STANDBY.req( ) to the PMD 214B, to place the receiver in standby for the remainder of the incoming frame (until end of frame event), as discussed above. As such, the checker 217 and the controller 218 of the MAC layer 216, along with the PLCP 214A and PMD 214B of the PHY layer 214 of the STA 204, comprise components of a power saving module for the STA 204.

Although in the description of FIG. 8 the STAs and the AP have been shown separately, each is a type of wireless communication station capable of transmitting and/or receiving over a wireless channel in a wireless communication system, such as a WLAN. Therefore, a wireless communication station herein can function as a transmitter, a receiver, an initiator and/or a responder. It then follows that an AP can function as a transmitter, a receiver, an initiator and/or a responder. Similarly, a STA can function as a transmitter, a receiver, an initiator and/or a responder.

As such, the present invention provides an efficient power saving method by interpreting PHY/MAC header information at per-frame level, for wireless communication networks. A power saving receiver (a station) stops receiving and decoding data symbols of an incoming frame when the receiver determines that it is not the intended receiver of the frame, thereby saving power. This makes the present invention suitable for such applications as CE devices and other devices which can benefit from power conservation, such as battery operated devices like wireless video cameras, cellular phones, etc. Unlike conventional approaches where the MAC layer waits for the entire MPDU to arrive before parsing the MPDU MAC header, according to an embodiment of the present invention the MAC layer decodes the MPDU MAC header without waiting for the entire MPDU to arrive at the MAC layer.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof;

however, other versions are possible. Therefore, the spirit and scope of the appended claims should not be limited to the description of the preferred versions contained herein.

What is claimed is:

1. A power saving method for communication in a wireless network, comprising:
   receiving a header of a transmitted data frame at a receiver;
   checking the header to determine if the frame is intended for that receiver, wherein checking the header includes checking a PHY header in the frame to determine if the receiver can support the capability required by the PHY header to receive the frame;
   stopping decoding of the frame, if the frame is not intended for that receiver; and
   stopping receiving the frame and entering the receiver into a power saving state if the frame is not intended for that receiver.

2. The method of claim 1, wherein the remainder of the frame comprises the data payload of the frame.

3. The method of claim 1 wherein entering a power saving state further includes entering the power saving state before the end of the frame.

4. The method of claim 3 wherein entering a power saving state further includes entering the power saving state without receiving or decoding to the end of the frame.

5. The method of claim 1 wherein: the PHY header comprises a HT-SIG field;
   checking the PHY header further includes:
   checking if an Advanced Coding (ADV) bit in the HT-SIG is set to "1", such that if the receiver cannot support advanced coding, the receiver enters into standby during the frame period;
   checking if a Space-Time Block Coding (STBC) bit in the HT-SIG is set to "1", such that if the receiver cannot support the STBC function, the receiver enters into standby during the frame period;
   checking if a Sounding Packet bit in the HT-SIG is set to "1", such that the receiver cannot support transmit beamforming, the receiver enters into standby during the frame period;
   checking if a 20/40 bandwidth (BW) bit in the HT-SIG is set to "1" to indicate the frame is transmitted in a 40 MHz channel, such that the receiver operates on a 20 MHz channel enters into standby during the frame period; and
   checking the Modulation and Coding Scheme (MCS) indicated in the HT-SIG, such that if the receiver cannot support the MCS, then the receiver enters into standby during the frame period.

6. The method of claim 1 wherein entering the receiver in a power saving state further includes:
   if the receiver cannot support the capability required by the PHY header, then concluding that the receiver is not the intended receiver of the frame and entering the receiver in a power saving state.

7. The method of claim 6 wherein:
   checking the PHY header further includes interpreting the HT-SIG field of the PLCP Protocol Data Unit (PPDU) format of the PHY header first before the entire frame payload arrives at a MAC layer of the receiver; and
   entering the receiver in a power saving state further includes entering the receiver in a power saving state if based on the interpretation, the frame is not intended for the receiver.

8. The system of claim 6 wherein:
   checking the header further includes:
   if the receiver can support the capability required by the PHY header, then checking a MAC header in the frame to determine if the receiver is identified therein; and
   entering the receiver in a power saving state further includes entering the receiver in a power saving state if the receiver is not identified in the MAC header.

9. The system of claim 6 wherein checking the header further includes checking a MAC header control field, such that:
   if a subfield Type <>"10", then a power saving state is not triggered;
   if a subfield To DS is "1", then further CRC checking is terminated; and
   if the entire MAC payload is not received by the MAC layer, then the receiver stops receiving and decoding the frame.

10. The system of claim 6 wherein checking the header further includes checking a MAC header control field, such that:
    if a subfield To DS is "0", and the subfield Address 1 in the MAC header is not equal to the receiver address and is not a broadcast/multicast address, then further CRC checking is terminated;
    if the entire MAC payload is not received by the MAC layer, then the receiver stops receiving and decoding the data frame.

11. The system of claim 6 wherein the receiver implements a type of IEEE 802.11n communication protocol.

12. The method of claim 1 wherein:
    the PHY header comprises a HT-SIG field; and
    checking the PHY header further includes checking the HT-SIG field to determine if the receiver can support the capability required by the PHY header to receive the frame.

13. The method of claim 1 wherein entering the receiver in a power saving state further includes requesting a PLCP sublayer of a PHY layer in the receiver to stop receiving and decoding the frame.

14. The method of claim 1 wherein the receiver implements a type of IEEE 802.11 communication protocol.

15. The method of claim 1 further comprising:
    upon channel failure or carrier loss, entering the receiver in a power saving state until the end of the frame transmission duration.

16. The method of claim 1 wherein the frame comprises said header and data payload, such that entering a power saving state further includes entering the power saving state before decoding the payload of the frame.

17. The method of claim 16 wherein entering a power saving state further includes entering the power saving state before decoding to the end of the payload of the frame.

18. A wireless communication system, comprising:
    a transmitter that is configured to transmit one or more data frames over a wireless channel; and
    a receiver that is configured to receive one or more frames over the wireless channel, wherein the receiver comprises a power saving module that is configured to stop decoding of the frame, and enter the receiver into a power saving state if an incoming frame is not intended for the receiver, wherein the power saving module comprises:
    a receiving module that is configured to receive a header of a transmitted frame;
    a checker that is configured to parse and check the header to determine if the frame is intended for that receiver and to check a PHY header in the frame to determine if the receiver can support the capability required by the PHY header to receive the frame; and a controller that is configured to stop receiving and decoding the frame, enter the receiver in a power saving state if the frame is not intended for that receiver.

19. The system of claim 18 wherein the receiver is further configured to continue to receive and decode the remainder of the frame if the frame is intended for that receiver.

20. The system of claim 18 wherein the controller is further configured to enter a power saving state before the end of the frame.

21. The system of claim 20 wherein the controller is configured to enter a power saving state without receiving or decoding to the end of the frame.

22. The system of claim 18 wherein the controller is further configured such that:
if the receiver can not support the capability required by PHY header, then the controller concludes that the receiver is not the intended receiver of the frame and enters the receiver in a power saving state.

23. The system of claim 22 wherein:
the checker is further configured such that, if the receiver can support the capability required by the PHY header, then the checker checks a MAC header in the frame to determine if the receiver is identified therein; and
the controller is further configured to enter the receiver in a power saving state if the receiver is not identified in the MAC header.

24. The system of claim 18 wherein:
the PHY header comprises a HT-SIG field; and
the checker is further configured to check the HT-SIG field to determine if the receiver can support the capability required by the PHY header to receive the frame.

25. The system of claim 24 wherein:
the checker is further configured to interpret the HT-SIG field of the PPDU format of the PHY header first before the entire frame payload arrives at a MAC layer of the receiver; and
the controller is further configured to enter the receiver in a power saving state if based on the interpretation, the frame is not intended for the receiver.

26. The system of claim 18 wherein the controller is further configured to enter the receiver in a power saving state by requesting a PLCP sublayer of a PHY layer in the receiver to stop receiving and decoding the frame.

27. The system of claim 18 wherein the receiver implements a type of IEEE 802.11 communication protocol.

28. The system of claim 18 wherein the controller is further configured to enter the receiver in a power saving state until the end of the frame transmission duration, upon detecting channel failure or carrier loss.

29. The system of claim 18 wherein the frame comprises said header and data payload, such that the controller is further configured to enter a power saving state before the payload of the frame is decoded.

30. A wireless receiver, comprising:
a receiving module that is configured to receive a header of a transmitted frame over a wireless channel;
a checker that is configured to parse and check the header to determine if the frame is intended for that receiver, the checker is further configured to check a PHY header in the frame to determine if the receiver can support the capability required by the PHY header to receive the frame; and a controller that is configured to enter the receiver into a power saving state if the frame is not intended for that receiver.

31. The receiver of claim 30 wherein the frame comprises said header and data payload, such that the controller is further configured to enter a power saving state before the payload of the frame is decoded.

32. The receiver of claim 30 wherein the controller is further configured to enter a power saving state before the end of the frame.

33. The receiver of claim 32 wherein the controller is configured to enter a power saving state without receiving or decoding to the end of the frame.

34. The receiver of claim 30 wherein the controller is further configured such that:
if the receiver can not support the capability required by the PHY header, then the controller concludes that the receiver is not the intended receiver of the frame and enters the receiver in a power saving state.

35. The receiver of claim 34 wherein:
the checker is further configured such that, if the receiver can support the capability required by the PHY header, then the checker checks a MAC header in the frame to determine if the receiver is identified therein; and
the controller is further configured to enter the receiver in a power saving state if the receiver is not identified in the MAC header.

36. The receiver of claim 35 wherein the controller is further configured to enter the receiver in a power saving state by requesting a PLCP sublayer of a PHY layer in the receiver to stop receiving and decoding the frame.

37. The receiver of claim 36 wherein the receiver further includes a PHY_STANDBY.req( ) function, such that the controller is configured to enter the receiver into a power saving mode by invoking the PHY_STANDBY.req( ) function to request a PLCP sublayer of a PHY layer in the receiver to stop receiving and decoding the incoming frame.

38. The receiver of claim 37 wherein the receiver further includes a PMD_STANDBY.req( ) function, and the PHY PLCP sublayer is configured such that after receiving a PHY_STANDBY.req( ) request from the controller, the PHY PLCP sublayer sends a PMD_STANDBY.req( ) to a PMD sublayer of the receiver to stop receiving and decoding the frame.

39. The receiver of claim 38 wherein the controller is configured to utilize the PHY_STANDBY.req( ) and PMD_STANDBY.req( ) functions if the checker can finish parsing and checking the MAC header before the PHY layer completes decoding the incoming frame.

40. The receiver of claim 30 wherein:
the PHY header comprises a HT-SIG field; and
the checker is further configured to check the HT-SIG field to determine if the receiver can support the capability required by the PHY header to receive the frame.

41. The receiver of claim 40 wherein:
the checker is further configured to interpret the HT-SIG field of the PPDU format of the PHY header first before the entire frame payload arrives at a MAC layer of the receiver; and
the controller is further configured to enter the receiver in a power saving state if based on the interpretation, the frame is not intended for the receiver.

42. The receiver of claim 30 wherein the controller is further configured to enter the receiver in a power saving state until the end of the frame transmission duration, upon detecting channel failure or carrier loss.

43. The receiver of claim 30 wherein the receiver implements a type of IEEE 802.11 communication protocol.

44. A wireless communication system, comprising:
a wireless station configured to enter a power saving state if an incoming frame is not intended for the wireless station, wherein the wireless station is configured to check a Physical layer (PHY) header in the frame to determine whether the wireless station supports the capability required by the PHY header to receive the frame.

45. A wireless station, comprising:
a processor employed to determine if a received frame is intended for the wireless station, in a Media Access Control (MAC) layer of the wireless station, check a Physical (PHY) header in the frame to determine if the wireless station can support the capability required by the PHY header to receive the frame, and to enter the wireless station into a power saving state if the frame is not intended for that wireless station by the MAC layer instructing a PHY layer of the wireless station to stop decoding the received frame.

46. A power saving method for communication in a wireless network, comprising:
receiving a Physical (PHY) header of a transmitted data frame at a Media Access Control (MAC) layer in a wireless station;
checking the PHY header in the MAC layer to determine if the wireless station can support the capability required by the PHY header to receive the frame; and
instructing a PHY layer in the wireless station by the MAC layer to stop receiving the frame and enter the wireless station into a power saving state if the frame is not intended for that wireless station.

* * * * *